(12) United States Patent
Benedikt et al.

(10) Patent No.: US 11,408,506 B2
(45) Date of Patent: Aug. 9, 2022

(54) SIMULATED REV-MATCHING IN A VEHICLE HAVING A TWO MOTOR HYBRID SYSTEM TRANSMISSION

(71) Applicant: TOYOTA MOTOR ENGINEERING & MANUFACTURING NORTH AMERICA, INC., Plano, TX (US)

(72) Inventors: Erik Hasso Benedikt, Ann Arbor, MI (US); Shannon Wrobel, Ann Arbor, MI (US); Justin Chow, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 400 days.

(21) Appl. No.: 16/548,306

(22) Filed: Aug. 22, 2019

(65) Prior Publication Data
US 2021/0054930 A1    Feb. 25, 2021

(51) Int. Cl.
*F16H 63/50* (2006.01)
*B60W 10/06* (2006.01)
(Continued)

(52) U.S. Cl.
CPC ........... *F16H 63/502* (2013.01); *B60W 10/06* (2013.01); *B60W 10/08* (2013.01); *B60W 20/11* (2016.01);
(Continued)

(58) Field of Classification Search
CPC ............... F16H 63/502; F16H 61/0403; F16H 2061/0418; F16H 2061/0422; B60W 20/11; B60W 10/06; B60W 10/08; B60W 2510/0638; B60W 2540/16; B60W 2710/0605; B60W 2710/0644
See application file for complete search history.

(56) References Cited

U.S. PATENT DOCUMENTS 7,641,586 B2   1/2010   Wild
8,010,264 B2   8/2011   Ogata
(Continued)

FOREIGN PATENT DOCUMENTS

| DE | 102005016117 A1 * | 7/2006 | ............. B60K 6/485 |
| EP | 2149488 A2 * | 2/2010 | ........... F02D 41/023 |
| JP | 2015160462 | 9/2015 | |

OTHER PUBLICATIONS

DE102005016117A1 machine translation filed Nov. 16, 2021 (Year: 2021).*
(Continued)

*Primary Examiner* — Tisha D Lewis
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for simulating rev-matching in hybrid electric vehicles (HEVs), e.g., HEVs having a two motor hybrid system transmission. In particular, increased engine response is provided while downshifting during acceleration. The two-motor hybrid system transmission may include an electronic control unit that controls the speed of the engine to simulate gears, and increases the speed of the engine responsive to a driver using the gear selector to shift from one of the simulated gears to a lower one of the simulated gears, thereby providing the desired rev-matching experience.

13 Claims, 5 Drawing Sheets

(51) Int. Cl.
  *B60W 10/08*    (2006.01)
  *B60W 20/11*    (2016.01)
  *F16H 61/04*    (2006.01)

(52) U.S. Cl.
  CPC . *F16H 61/0403* (2013.01); *B60W 2510/0638* (2013.01); *B60W 2540/16* (2013.01); *B60W 2710/0605* (2013.01); *B60W 2710/0644* (2013.01); *F16H 2061/0418* (2013.01); *F16H 2061/0422* (2013.01)

(56)          References Cited

U.S. PATENT DOCUMENTS

| | | |
|---|---|---|
| 8,798,838 B2 | 8/2014 | Yamanaka |
| 9,512,916 B2 | 12/2016 | Baumgartner |
| 9,567,920 B2 | 2/2017 | Ashmore |
| 9,624,846 B2 | 4/2017 | Cousins |
| 9,719,595 B2 | 8/2017 | Bur |
| 9,802,509 B2 | 10/2017 | Matsushima |
| 2014/0004994 A1 | 1/2014 | Wang |
| 2015/0012159 A1* | 1/2015 | Honda .................. B60W 20/00 701/22 |
| 2018/0236866 A1 | 8/2018 | Paterno |
| 2018/0335135 A1 | 11/2018 | Shufro |
| 2021/0206254 A1* | 7/2021 | Benedikt .................. B60K 6/36 |

OTHER PUBLICATIONS

Synchronized down shift rev-matching system, https://en.wikipedia.org/wiki/Synchronized_down_shift_rev-matching_system, website acessed Feb. 26, 2019, Wikipedia.

\* cited by examiner

SIMULATED REV-MATCHING IN A VEHICLE HAVING A TWO MOTOR HYBRID SYSTEM TRANSMISSION

TECHNICAL FIELD

The present disclosure relates generally to hybrid electric vehicles (HEVs), and in particular, some implementations may relate to control systems for controlling drivetrains of such HEVs.

DESCRIPTION OF RELATED ART

HEVs typically are designed and configured with conventional, automatic transmissions, automatic continuously variable transmissions (CVTs), or hybrid drive systems that use, e.g., an electric drive and planetary gearset that performs similarly to CVTs. Some HEVs are developed to attract customers familiar with manual transmissions. Some HEVs are configured with a sport mode, a sequential shift mode, etc.

BRIEF SUMMARY OF THE DISCLOSURE

According to various embodiments of the disclosed technology, a vehicle may comprise an internal combustion engine, the internal combustion engine having a throttle. The vehicle may further comprise a two motor hybrid system transmission mechanically coupled to the internal combustion engine, and a shift selector to enable a driver of the vehicle to select a plurality of simulated gears of the two motor hybrid system transmission. Further still, the vehicle may comprise an electronic control unit configured to cause a rotational speed of the internal combustion engine to increase, responsive to the driver of the vehicle using the shift selector to shift from a first one of the simulated gears to a second one of the simulated gears. In some embodiments, the second one of the simulated gears is lower than the first one of the simulated gears. To cause the rotational speed of the internal combustion engine to increase, the electronic control unit is further configured to cause the throttle of the internal combustion engine to open.

In some embodiments, the electronic control unit is further configured to cause the rotational speed of the internal combustion engine to increase to a speed that is selected based on a property of at least one of the first one and the second one of the simulated gears.

In some embodiments, to cause the throttle of the internal combustion engine to open, the electronic control unit is further configured to transmit a target engine speed to the internal combustion engine. In some embodiments, the target engine speed is determined by a gear ratio of a desired one of the plurality of simulated gears. In some embodiments, the target engine speed is adjusted based on at least one of vehicle speed trajectory and expected vehicle speed upon completion of the shift from the first one of the simulated gears to the second one of the simulated gears. In some embodiments, the target engine speed is further adjusted based on safety considerations pursuant to accelerator pedal actuation.

In some embodiments, the vehicle may further comprise an electric motor mechanically coupled to the internal combustion engine. The electronic control unit is further configured to cause a rotational speed of the electric motor to increase. In some embodiments, to cause a rotational speed of the electric motor to increase, the electronic control unit is further configured to transmit a target engine speed to the electric motor.

In accordance with some embodiments, a vehicle comprises an internal combustion engine, the internal combustion engine having a throttle. The vehicle may further comprise a two motor hybrid system transmission mechanically coupled to the internal combustion engine. Further still, the vehicle may comprise a shift selector to enable a driver of the vehicle to select a plurality of simulated gears of the two motor hybrid system transmission. The shift selector enables the driver to generate a downshift request responsive to the driver of the vehicle using the shift selector to shift from a first one of the simulated gears to a second one of the simulated gears, the second one of the simulated gears being lower than the first one. Further still, the vehicle comprises a hardware processor, and a non-transitory machine-readable storage medium encoded with instructions executable by the hardware processor to perform operations. The operations may include receiving the downshift request. Responsive to the downshift request, the operations include causing the throttle of the internal combustion engine to open, which causes a rotational speed of the internal combustion engine to increase.

In some embodiments, the operations further comprise causing the rotational speed of the internal combustion engine to increase to a speed that is selected based on a property of at least one of the first one and the second one of the simulated gears.

In some embodiments, the speed that is selected varies based on at least one of vehicle speed trajectory and expected vehicle speed upon completion of the downshift.

In some embodiments, the speed that is selected is further varied based on safety considerations pursuant to accelerator pedal actuation.

In some embodiments, the vehicle may further comprise an electric motor mechanically coupled to the internal combustion engine. Causing a rotational speed of the electric motor to increase in response to a request for increased rotational speed of the electric motor causes the rotational speed of the internal combustion engine to further increase.

In accordance with still other embodiments, a non-transitory machine-readable storage medium may be encoded with instructions executable by a hardware processor of a computing component of a vehicle having a two motor hybrid system transmission. The machine-readable storage medium may comprise instructions to cause the hardware processor to perform operations. The operations may include receiving a downshift request. The downshift request may indicate that a driver of the vehicle has used a shift selector of the vehicle to shift from a first simulated gear to a second simulated gear, wherein the second simulated gear is lower than the first gear. Responsive to the downshift request, the operations may cause a rotational speed of an internal combustion engine of the vehicle to increase, i.e., cause a throttle of the internal combustion engine to open.

In some embodiments, the operations further comprise causing the rotational speed of the internal combustion engine to increase to a speed that is selected based on a property of at least one of the first and second simulated gears.

In some embodiments, the speed that is selected is adjusted based on at least one of speed trajectory of the vehicle and expected speed of the vehicle upon completion of the downshift.

In some embodiments, the speed that is selected is further adjusted based on safety considerations pursuant to accelerator pedal actuation.

In some embodiments, causing a rotational speed of an electric motor of the vehicle to increase in response to a request for increased rotational speed of the electric motor causes the rotational speed of the internal combustion engine to further increase.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As alluded to above, HEVs can be provided with a sport mode to provide, e.g., a more spirited driving experience. However, conventional sport mode implementations in HEVs may still not provide the driving experience desired by certain customers. This can be the result of the engine response in an HEV (when in sport mode) not matching that of a conventional manual transmission. For example, engine speed in conventional HEVs tends to ramp up slowly after a downshift, which often fails to result in any increased sound/rate of forward progress normally associated with downshifting. Thus, conventional "high engine response" logic that may be used in the sport or sequential shift mode still cannot mimic rev-matching.

Rev-matching can refer to a technique used with conventional manual transmissions for smoothing the transition between gears, increasing the speed of gear changes, and prevent shock loads through the manual transmission when down-shifting. To perform rev-matching in a vehicle with a manual transmission, a driver may increase engine rotational speed by opening the throttle and revving the engine during a downshift to match the increased rotational speed of the transmission required for the new gear,—hence the term, rev-match. Doing this avoids the mechanical shock that would result from a mismatch. Rev-matching can also result in certain pleasing noises and increased engine speed.

Embodiments of the systems and methods disclosed herein can provide simulated rev-matching, or more generally, added engine response while downshifting during acceleration, in a vehicle having a hybrid drive system, such as a two-motor hybrid system transmission. The two-motor hybrid system transmission may include an electronic control unit that controls the speed of the engine to simulate gears, and increases the speed of the engine responsive to a driver using the gear selector to shift from one of the simulated gears to a lower one of the simulated gears, thereby providing the desired rev-matching experience.

The systems and methods disclosed herein may be implemented with or by any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well. An example hybrid electric vehicle (HEV) in which embodiments of the disclosed technology may be implemented is illustrated in FIG. 1.

Figure 1:
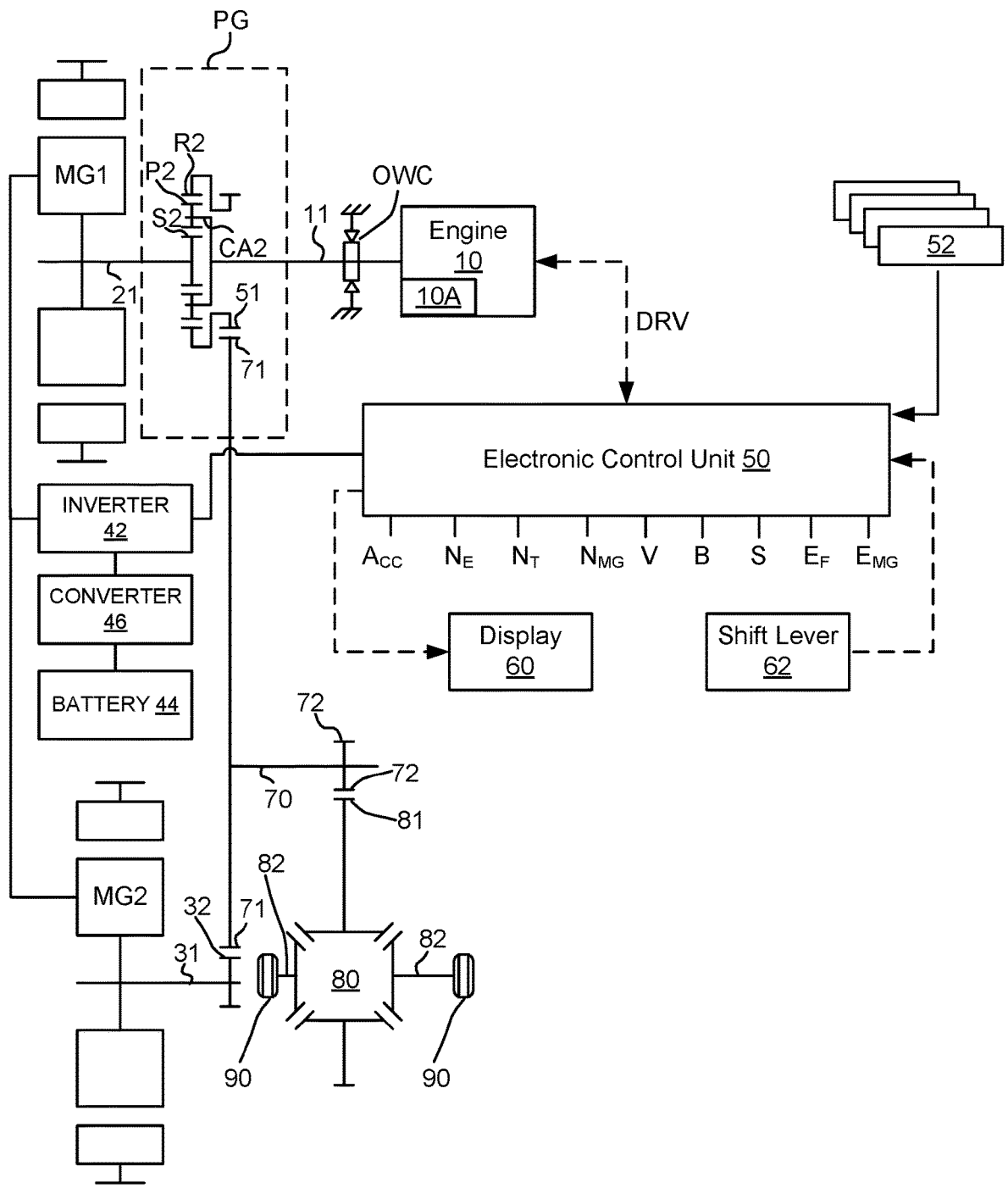
FIG. 1 is a schematic representation of an example hybrid vehicle with which embodiments of the systems and methods disclosed herein may be implemented.

FIG. 1 is a diagram illustrating an overall configuration of a hybrid vehicle 2 according to the present embodiment. Hybrid vehicle 2 may include an engine 10, a motor generator MG1, a motor generator MG2, a power split device (planetary gear device) PG, a counter shaft (output shaft) 70, a differential gear system 80, drive wheels 90, a shift lever 62, a display unit 60, and an Electronic Control Unit (ECU) 50.

Hybrid vehicle 2 may be referred to as a front-engine/front-drive (FF type) hybrid vehicle which moves by using power from at least one of engine 10, motor generator MG1 and motor generator MG2. It should be understood that hybrid vehicle 2 is not limited to being an FF type hybrid vehicle. For example, hybrid vehicle 2 may be a front-engine/rear-drive (FR) type hybrid vehicle. Moreover, hybrid vehicle 2 may be a plug-in hybrid vehicle mounted with a battery 44 which can be charged by using an external power source (not shown).

Engine 10 may be, for example, an internal combustion engine (ICE) such as a gasoline engine or a diesel engine or similarly powered engine in which fuel is injected into and combusted in a combustion chamber. Engine 10 may be controlled by control signals from ECU 50. For example, an output control circuit 10A may be provided to control engine 10. Output control circuit 10A may include a throttle actuator to control an electronic throttle valve that controls air intake and fuel injection (as a byproduct of controlling air intake), fuel injection, an ignition device that controls ignition timing, and the like. Regarding air intake, it should be understood that generally, the throttle opens allowing air to move into the intake. ECU 50/sensors 52 may measure the airflow into the intake. ECU 50 commands the fuel injectors to output the specific amount of fuel needed to reach the target air to fuel ratio based on driving conditions and engine 10 parameters/characteristics. Output control circuit 10A may execute output control of engine 10 according to a command control signal(s) supplied from ECU 50, as described herein. Such output control can include, for example, throttle control, fuel injection control, and ignition timing control.

ECU 50 may include circuitry to control various aspects of vehicle operation. ECU 50 may include, for example, a microcomputer that includes a one or more processing units (e.g., microprocessors), memory storage (e.g., RAM, ROM, etc.), and I/O devices. The processing units of ECU 50 execute instructions stored in memory to control one or more electrical systems or subsystems in the vehicle. ECU 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

In the example illustrated in FIG. 1, ECU 50 receives information from a plurality of sensors included in vehicle 2. For example, ECU 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of engine 10 (engine RPM), a rotational speed, $N_{MG1}/N_{MG2}$, of motor generators MG1 and MG2, respectively (motor rotational speed), and vehicle speed, $N_V$. These may also include brake operation amount/pressure, B, steering wheel angle/rotation, S, battery SOC (i.e., the charged amount for the battery detected by an SOC sensor). Accordingly, vehicle 2 can include a plurality of sensors 52 that can be used to detect various conditions internal or external to the vehicle and provide sensed conditions to ECU 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG1}$ and $E_{MG2}$, hybrid (engine 10+MG1 and/or MG2) efficiency, etc.

In some embodiments, one or more of the sensors 52 may include their own processing capability to compute the results for additional information that can be provided to ECU 50. In other embodiments, one or more sensors may be data-gathering-only sensors that provide only raw data to ECU 50. In further embodiments, hybrid sensors may be included that provide a combination of raw data and processed data to ECU 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Motor generator MG1 and motor generator MG2 each may be a permanent magnet type synchronous motor including for example, a rotor with a permanent magnet embedded therein. A rotation shaft 21 of motor generator MG1 may be disposed coaxially with a crank shaft 11 of engine 10. A rotation shaft 31 of motor generator MG2 may be disposed parallel to rotation shaft 21 of motor generator MG1. Counter shaft (output shaft) 70 may be disposed parallel to rotation shaft 21 of motor generator MG1 and rotation shaft 31 of motor generator MG2.

Motor generator MG1 and motor generator MG2 may each be driven by an inverter 42. The inverter 42 may be controlled by a control signal from ECU 50 so as to convert direct current (DC) power from battery 44 to alternating current (AC) power, and supply the AC power to motor generators MG1 and MG2. Motor generator MG2 may be driven by electric power generated by motor generator MG1. It should be understood that the in embodiments where motors MG1, MG2 are DC motors, no inverter is required. The inverter, in conjunction with a converter assembly 46 may also accept power from one or more of motor generators MG1, MG2 (e.g., during engine charging), and uses this power to charge battery 44 (hence the name, motor generator). ECU 50 may control the inverter, adjust driving current supplied to motor generator MG2, and adjust the current received from motor generator MG1 during regenerative coasting and breaking.

Battery 44 may be implemented as one or more batteries or other power storage devices including, for example, lead-acid batteries, lithium ion batteries, capacitive storage devices, and so on. Battery 44 may also be charged by one or more of motor generators MG1, MG2 such as, for example, by regenerative braking or by coasting during which one or more of motor generators MG1, MG2 operates as generator. Alternatively (or additionally, battery 44 can be charged by motor generator MG1, for example, when vehicle 2 is in idle (not moving/not in drive). Further still, battery 44 may be charged by a battery charger (not shown) that receives energy from engine 10. The battery charger may be switched or otherwise controlled to engage/disengage it with battery 44. For example, an alternator or generator may be coupled directly or indirectly to a drive shaft of engine 10 to generate an electrical current as a result of the operation of engine 10. Still other embodiments contemplate the use of one or more additional motor generators to power the rear wheels of a vehicle (e.g., in vehicles equipped with 4-Wheel Drive), or using two rear motor generators, each powering a rear wheel.

Battery 44 may also be used to power other electrical or electronic systems in the vehicle. Battery 44 can include, for example, one or more batteries, capacitive storage units, or other storage reservoirs suitable for storing electrical energy that can be used to power motor generator MG1 and/or motor generator MG2. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

Power split device PG can refer to planetary gear device, such as a single pinion type planetary gear device, which may include a sun gear S2, a pinion gear P2, a ring gear R2 and a carrier CA2. Carrier CA2 of power split device PG may be coupled to crankshaft 11 of engine 10. Pinion gear P2 may be disposed between sun gear S2 and ring gear R2, meshing with sun gear S2 and ring gear R2, respectively. Pinion gear P2 may be supported by carrier CA2, capable of undergoing rotation and revolution. Sun gear S2 may be coupled to rotation shaft 21 of motor generator MG1. Ring gear R2 may be coupled to a counter drive gear 51. Counter drive gear 51 can be an output gear of power split device PG, rotating together with ring gear R2.

It should be understood that the rotation speed of sun gear S2 (i.e., the rotation speed of motor generator MG1), the rotation speed of carrier CA2, and the rotation speed of ring gear R2 satisfy a linear relationship collinearly (i.e., once any two of the rotation speeds are determined, the last rotation speed is also determined). Therefore, by adjusting the rotation speed of motor generator MG1, it is possible to alter the ratio between the rotation speed of ring gear R2 and the rotation speed of carrier CA2 continuously.

Counter shaft (output shaft) 70 may be provided with a counter drive gear 71 and a differential drive gear 72. Counter drive gear 71 meshes with counter drive gear 51 of power split device PG. Thus, power from engine 10 and motor generator MG1 can be transmitted to counter shaft (output shaft) 70 via counter drive gear 51 of power split device PG.

Power split device PG may be connected to a point in a power transmission path from engine 10 to counter shaft (output shaft) 70. Therefore, after the rotation of engine 10 is gear-shifted in power split device PG, it can be transmitted to counter shaft (output shaft) 70.

Counter drive gear 71 meshes with a reduction gear 32 coupled to rotation shaft 31 of motor generator MG2. In this way, the power of motor generator MG2 can be transmitted to counter shaft (output shaft) 70 via reduction gear 32.

Differential drive gear 72 meshes with a differential ring gear 81 disposed in differential gear system 80. Differential gear system 80 may be coupled to right and left drive wheels 90 through right and left drive shafts 82, respectively. In other words, the rotation of counter shaft (output shaft) 70 can be transmitted to the right and left drive shafts 82 through differential gear system 80.

In hybrid vehicle 2, crank shaft 11 of engine 10 is provided with a one-way clutch (OWC). One-way clutch OWC prevents the reverse rotation of engine 10. Thus, when a driver intends to move the vehicle rearward, with the help of one-way clutch OWC, the vehicle can be moved rearward simply by reversely rotating motor generator MG2 without performing any control on engine 10 and motor generator MG1.

The example vehicle illustrated by FIG. 1 is provided for illustration purposes only as one example of a vehicle system with which embodiments of the disclosed technology may be implemented. One of ordinary skill in the art reading this description will understand how the disclosed embodiments can be implemented with other vehicle platforms.

Figure 2:
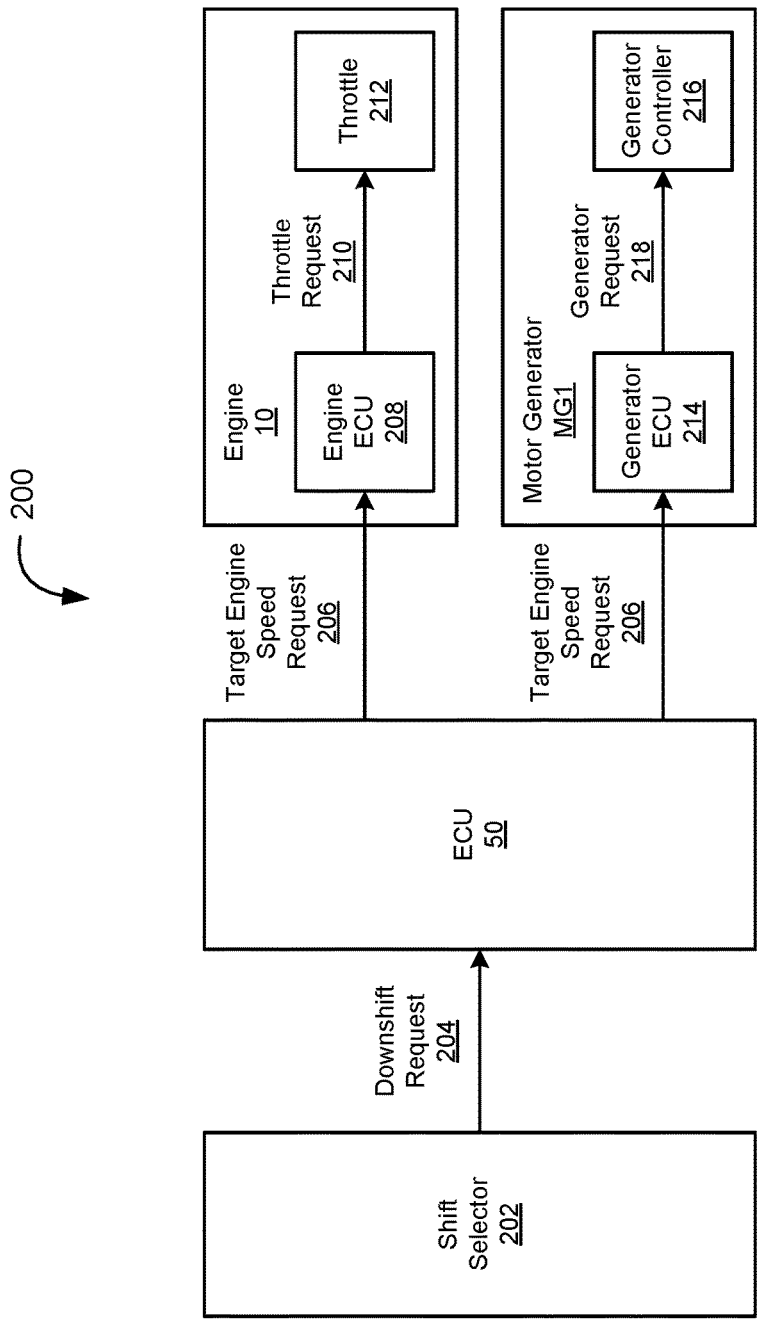
FIG. 2 illustrates an example system for simulated rev-matching in a vehicle having a two motor hybrid transmission according to embodiments of the disclosed technology.

FIG. 2 illustrates a system 200 for providing or effectuating high engine response logic, which in some cases, may include simulate rev-matching in a vehicle, such as vehicle 2 of FIG. 1, having a two motor hybrid system transmission according to embodiments of the disclosed technology. Referring to FIG. 2, the system may include a shift selector 202. A driver of the vehicle may employ the shift selector 202 to select a plurality of simulated gears. Each of the simulated gears may be implemented by controlling the two motor hybrid system transmission to implement a corresponding simulated gear ratio.

The shift selector 202 may be implemented as a stick shift, one or more steering column paddles, one or more buttons, or the like. In some embodiments, the shift selector 202 may be used to select a particular simulated gear, for example such as third gear. For example, in such embodiments, a stick shift may be moved to any of a plurality of positions, in an H-formation, sequentially, or other manner, each representing one of the simulated gears. In some embodiments, the shift selector 202 may be used shift to a next higher gear, to shift to a next lower gear, or the like. For example, one steering column paddle may be used to shift to a next higher gear, while another steering column paddle may be used to shift to a next lower gear. Other shift selector mechanisms are contemplated.

When the shift selector 202 is used to shift gears, a corresponding signal may be transmitted to the ECU 50. For example, when the shift selector 202 is used to shift to a lower gear, i.e., to downshift, a downshift request 204 is sent to the ECU 50. According to the described technology, the ECU 50 may respond to the downshift request 204 by determining a target engine speed which can be represented or indicated by a target engine speed request, as described below.

In some embodiments, the target engine speed request 206 is sent to the engine 10. Engine 10 may include an engine ECU 208 and a throttle 212 (which may be one embodiment of or be operatively connected to output control circuit 10A of FIG. 1). Responsive to receipt of the target engine speed request 206, the engine ECU 208 may generate a throttle request 210. Responsive to the throttle request 210, the throttle 212 of the engine 10 may open. The opening of the throttle 212 results in an increase in the rotational speed, $N_E$, of engine 10. The sound and acceleration produced by this operation induce sensations in the driver and passengers that simulate those produced by rev-matching using a manual transmission. These sensations are very pleasing to some drivers and passengers.

Figure 3:
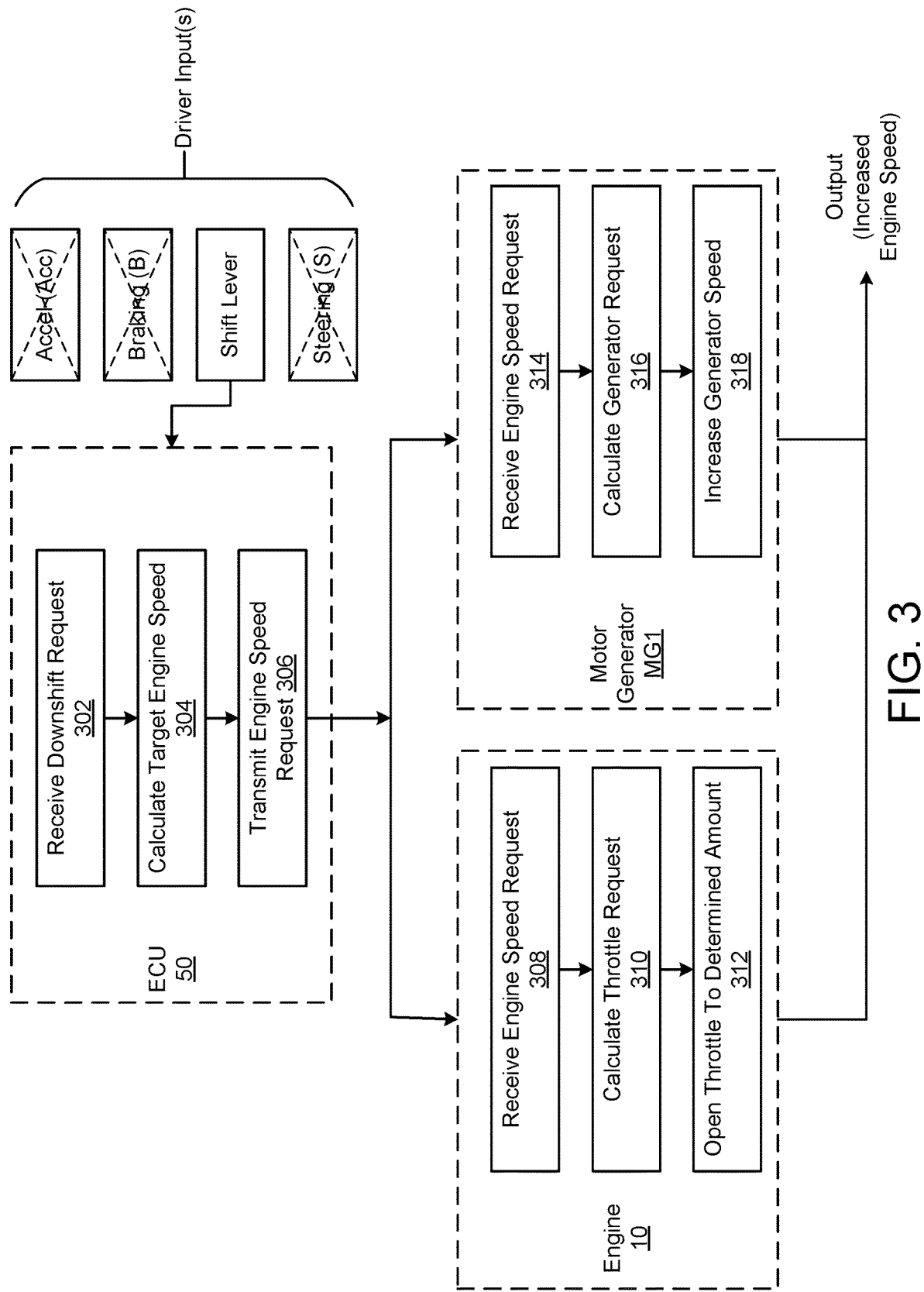
FIG. 3 illustrates example operations of the system of FIG. 2 for simulated rev-matching in a vehicle having a two motor hybrid transmission according to embodiments of the disclosed technology.

As noted above, in a two motor hybrid system transmission, at least one of the two motors generators (MG1, MG2 of FIG. 1), may be used to propel a vehicle (vehicle 2) in addition to its engine (engine 10). In such embodiments, the rotational speed of engine 10 may be increased, not only by opening throttle 212 of engine 10, but also by increasing the rotational speed of the motor generator MG1. In such embodiments, the target engine speed request 206 may also be sent to motor generator MG1. Motor generator MG1 may include a generator electronic control unit (ECU) 214 and a generator controller 216. Responsive to receipt of the target engine speed request 206, generator ECU 214 may generate a generator request 218. Responsive to generator request 218, generator controller 216 may increase a rotational speed of motor generator MG1. As noted above, MG1 may be mechanically coupled to engine 10, for example by a power split/planetary gear system or the like. Therefore, the rotational speed of the engine 10 increases with the rotational speed of motor generator MG1, enhancing the rev-matching sensation described above. It should be understood that MG1 may be in a "motoring" mode, where MG1 provides torque to engine 10 to assist with increasing the RPMs of engine 10 while at the same time, engine 10 increases its own speed via throttle control. It should also be understood that inverter 42 is operative to allow MG1 to provide the aforementioned torque to engine 10. FIG. 3 illustrates example operations that may be performed by a system to simulate rev-matching in a vehicle having a two motor hybrid system transmission according to embodiments of the disclosed technology. In FIG. 3, the operations are grouped according to components of the system (which may be an embodiment of system 200 of FIG. 2), and will be described in conjunction with FIG. 2. In particular, operations 302-306 may be performed by the ECU 50, operations 308-312 be performed by engine 10, and operations 314-318 may be performed by the motor generator MG1.

Referring to FIG. 3, the ECU 50 may receive a downshift request 204, at 302. The downshift request 204 may be generated as described above, e.g., by a driver using a shift lever to simulate downshifting. It should be understood that other driver inputs that might normally prompt a change in engine speed in a conventional engine-only vehicle, may, in some embodiments be ignored, e.g., accelerator pedal actuation, brake pedal actuation, and steering rotation/angle. It should be understood that at or around the moment that the simulated downshift request 204 occurs, driver throttle can generally be ignored. However, after the downshift is completed, the driver will have full control over engine 10 speed, the output of the two motor hybrid system transmission, etc. This is because engine 10 speed should have a specific target engine speed at the moment of the simulated downshift, and any change in target engine speed during the simulated downshift may feel like transmission slippage which can be undesirable. Current vehicle speed, road grade, and throttle position for example, can be considered by ECU 50 at the time the target engine speed (indicated by a target engine speed request) is calculated or set. That is, the target engine speed can be preemptively raised/lowered based on vehicle speed trajectory and expected vehicle speed at the end of the simulated downshift. Still other factors that can be considered include, for example, engine 10 temperature, battery 44 state of charge, mechanical limitations, and the like. Accordingly, and responsive to receiving the downshift request 204, the ECU 50 may calculate a target engine speed request 206, at 304. The target engine speed request 206 may be calculated based upon a number of factors. The factors may include engine temperature, battery state of charge, mechanical limitations, and the like.

It should be noted that the engine response can be customized or otherwise adjusted/altered based off of driver needs and/or specific driver requests, albeit so long as they remain within the mechanical limitations of the two motor hybrid system transmission. That is, a driver or manufacturer may wish to provide special or multi-leveled modes that provide different engine response characteristics. For example, the two motor hybrid system transmission may in some embodiments, simulate even closer gear ratios keeping engine 10 within a tighter range of its peak powerband, e.g., a "super" sport mode.

Alternatively, in some embodiments, the factors may include a position of the accelerator pedal of the vehicle, i.e., the more the accelerator pedal of the vehicle is depressed, the higher a target engine speed 206 may be generated. It should be noted that in such embodiments, the target engine speed is determined by the ratio of the desired simulated gear that can be actuated by the gear selector, where the amount of accelerator pedal actuation can be factored in as a safety consideration. For example, a driver may be operating vehicle 2 in a "lower" gear commanding less engine 10 RPMs and less responsiveness, but segues into a 100% throttle condition to avoid an accident, speed up to merge, etc. Vehicle 2 may respond by simulating the requested downshift to the lowest possible simulated gear and providing maximum drive force/powertrain response.

In some embodiments, the factors may include a property of the selected simulated gear, a property of the previously-selected simulated gear, or both. In some embodiments, the property may include a gear ratio implemented by the simulated gear. In such embodiments, for example, a higher target engine speed 206 may be implemented for a lower gear ratio than for a higher gear ratio, i.e., engine speed should increase after a downshift in a conventional, manual transmission car, and it is during this scenario when rev-matching may be performed, and in the case of various embodiments disclosed herein, when rev-matching can be simulated.

The ECU 50 may transmit the target engine speed request 206, at 306. Engine 10, or more particularly, ECU 208, may receive the target engine speed request 206, at 308. Responsive to receiving the target engine speed request 206, engine 10/ECU 208 may calculate a throttle request 210, at 310. The throttle request 210 may be calculated based upon the target engine speed request 206. This calculation for throttle request 210 can be based on the mechanical capabilities of engine 10 and the RPM rise rate of engine 10 in the wide open throttle condition while being augmented by the addition of MG1 torque. The throttle request 210 may be calculated based upon a number of other factors as well. The factors may include engine temperature, mechanical limitations, and the like. For example, with lower engine 10 temperatures, it would be undesirable to rev engine 10 as high (compared to a scenario in which engine 10 temperatures were higher) in order to limit wear/high load. Accordingly, one or more of the simulated gears that, if engaged, would surpass the RPM limit of engine 10 at the given engine temperature, can be locked out. Thus, the throttle request calculation for each gear would be the same, but certain simulated gear ratios would be locked out. The same or similar gear/gear ratio lockouts can be implemented in light of certain mechanical limitations of vehicle 2 when attempting to simulate rev-matching to provide the improved engine response disclose d in various embodiments.

Engine 10 may open its throttle 212 to the determined amount responsive to the throttle request 210, at 312. The amount of throttle opening may be included in the throttle request 210. The duration of throttle opening may also be included in the throttle request 210. The throttle request 210 may also specify a final throttle setting to be implemented following the throttle opening. Ultimately, the throttle request comprises one or more values, settings, and/or parameters that can be used to effectuate the desired target engine speed calculated above.

As described above, some embodiments employ motor generator MG1, in addition to engine 10, to increase engine speed. In such embodiments, motor generator MG1 may receive the target engine speed request 206 transmitted by the ECU 50, at 314. Responsive to receiving the target engine speed request 206, the generator ECU 214 may calculate a generator request 218, at 316, which can comprise a request for increased torque. The generator request 218 may be calculated based upon the target engine speed request 206. The generator request 318 may be calculated based upon a number of other factors as well, including but limited to current engine speed, mechanical limitations, and the like. Calculation of the generator request 318 may be performed similarly to the manner in which throttle request 210 is calculated.

Responsive to the generator request 218, the generator controller 216 may increase the rotational speed of the generator 207. Because MG1 is operatively/mechanically coupled to engine 10 vis-à-vis shaft 21, this increase in rotational speed of motor generator MG1 increases the rotational speed of engine 10. Whether by way of opening a throttle and/or by using a motor generator to add energy, the output of system 200/the method of FIG. 3 is increased engine speed, which results in, e.g., increased noise/sound and rev'ing of engine 10 to simulate rev-matching.

With conventional HEVs, for example, when a driver of a vehicle requests a downshift 204 (e.g., at a time T0), without any logic to control engine response, the target engine speed request 206 is set to "slowly" or gradually ramp up, which doesn't necessarily comport with downshifting in, e.g., engine-only vehicles. With conventional HEV engine response logic, the target engine speed request 206 is set to ramp up more quickly by a time, T1. It should be understood that target engine speed request 206 can refer to a derivative of actual engine speed indicating how quickly engine speed is changing, e.g., decreasing. Current HEV engine response logic sends (e.g., via ECU) a target engine speed request request to achieve a target engine speed.

With conventional implementations of engine response logic in HEVs, additional torque may be generated by a motor generator, and hence, a generator request 218 may be generated. Without conventional HEV engine response logic, no torque is requested of the motor generator, and with conventional HEV engine response logic, additional torque is requested after the time T0, and the additional torque is cut off by the time T1. In terms of the impact of the conventional engine response logic on actual engine speed, it can be appreciated that engine speed may ramp up, but the ramp up does not match the target engine speed. Hence, as described above, conventional engine response logic (based on motor generator torque alone) cannot be used to accurately simulate rev-matching, and the increased auditory impact (increased engine noise/sound) cannot be achieved.

Figure 4:
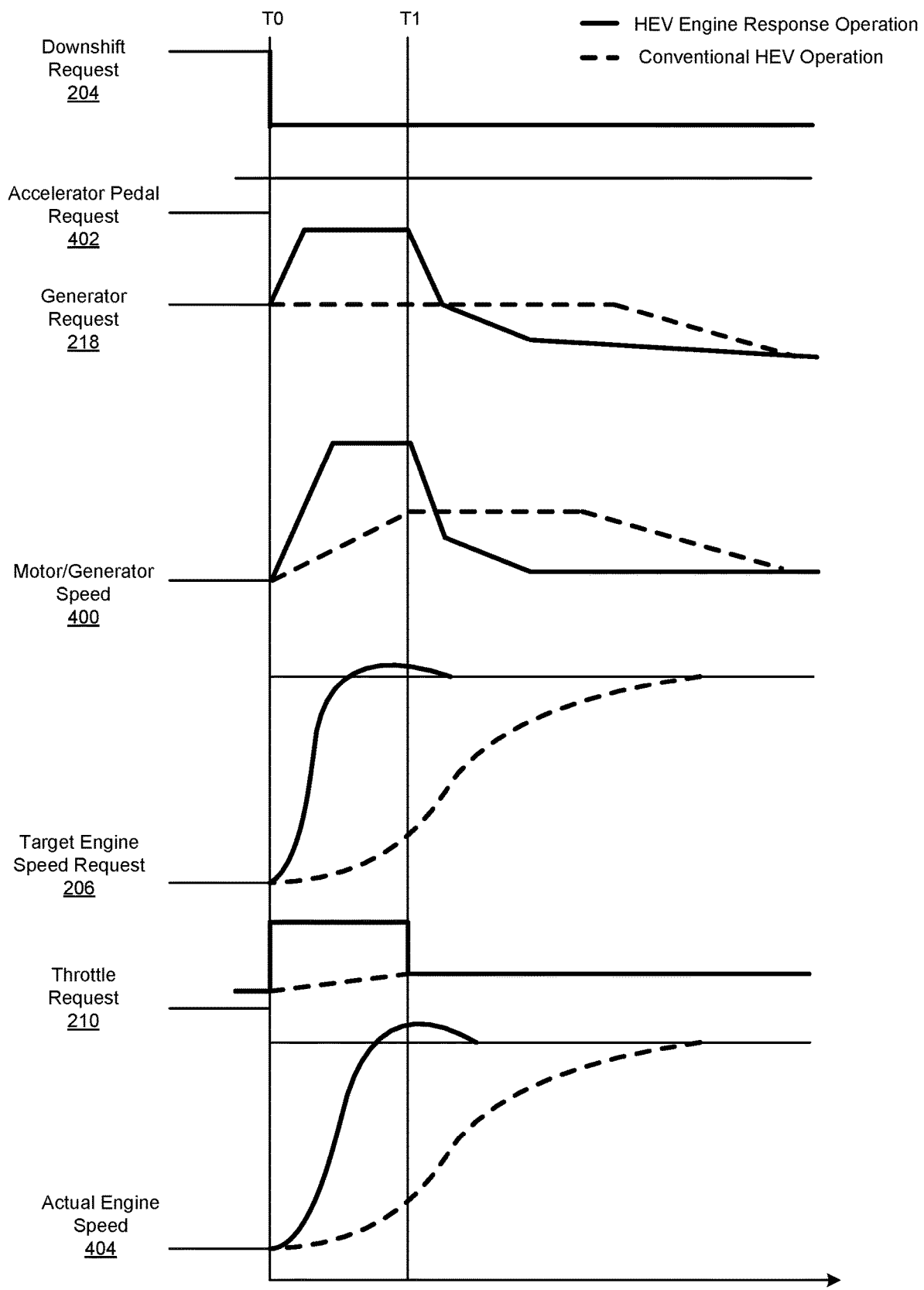
FIG. 4 is a graphical illustration of a timeline reflecting engine response logic in accordance with various embodiments of the disclosed technology.

In contrast, the engine response logic disclosed herein, according to various embodiments, is able to simulate rev-matching. That is, by engaging throttle response (and in some embodiments by also engaging MG1 to provide additional torque), actual engine speed can be made to match or at least more closely match the target engine speed. Engine noise/sound is increased which also assists in better simulating the rev-matching experience desired by some drivers of HEVs. FIG. 4 is a graphical illustration of a timeline reflecting example high engine response logic disclosed herein. Such logic may be performed/executed by system 200 of FIG. 2.

A driver of a vehicle, e.g., vehicle 2 of FIG. 2 may actuate a shift lever (to simulate a downshift) as described above, and a downshift request 204 can be generated at time T0. As also described above, in response to a downshift request, a target engine speed is calculated (which can be specified by way of a desired/target engine speed request 206). Without high engine response logic, the target engine speed represented by the dashed line corresponds to a gradual or "slow" ramp up. In contrast, the target engine speed request 206, when high engine response logic is enabled via system 200 of FIG. 2, results in better/higher engine response evidenced by the steeper curve between times T0 and T1.

In some embodiments, torque generated by a motor generator, e.g., motor generator MG1, may be used to assist in increasing engine speed to better comport with the target engine speed vis-à-vis target engine speed request 206. As described above, the additional torque generated in response to generator request 218 may be used to increase the speed of engine 10. That is, upon receipt of a target engine speed request 206 at operation 314 of FIG. 3, a generator request 218 may be calculated at operation 316 of FIG. 3, and torque output from motor generator MG1 can be increased at operation 318 of FIG. 3. This increase in torque is reflected between times T0 and T1, and is shown in FIG. 4 as motor/generator speed 400.

Moreover, engine speed may be increased through throttle control. As described above, upon receiving downshift request 204, ECU 50 of vehicle 2 calculates the target engine speed, which can be transmitted to the ECU 208 of engine 10 in the form of target engine speed request 206, whereupon a throttle request 210 can be calculated at operation 310, resulting in the throttle 212 opening at operation 312. As a result of the throttle 212 opening (and if implemented, additional torque from motor generator MG1), actual engine speed 404 is increased. It should be appreciated that the result is increased engine speed such that actual engine speed 404 more closely matches the target engine speed request 206 between times T0 and T1. It should be understood that driver input, such as accelerator pedal request 402 may be ignored. That is, the driver of vehicle 2 may depress the accelerator pedal, but the accelerator pedal's actuation is not a factor or consideration when calculating target engine speed 206 and increasing engine speed to actual engine speed 404. Rather, the simulated rev-matching (matching actual engine speed response to target engine speed response) is achieved by calculating the target engine speed request 206 in light of operating temperature, battery SOC, certain constraints if applicable, etc., and using motor generator MG1 and/or opening throttle 212 to increase the speed of engine 10.

Figure 5:
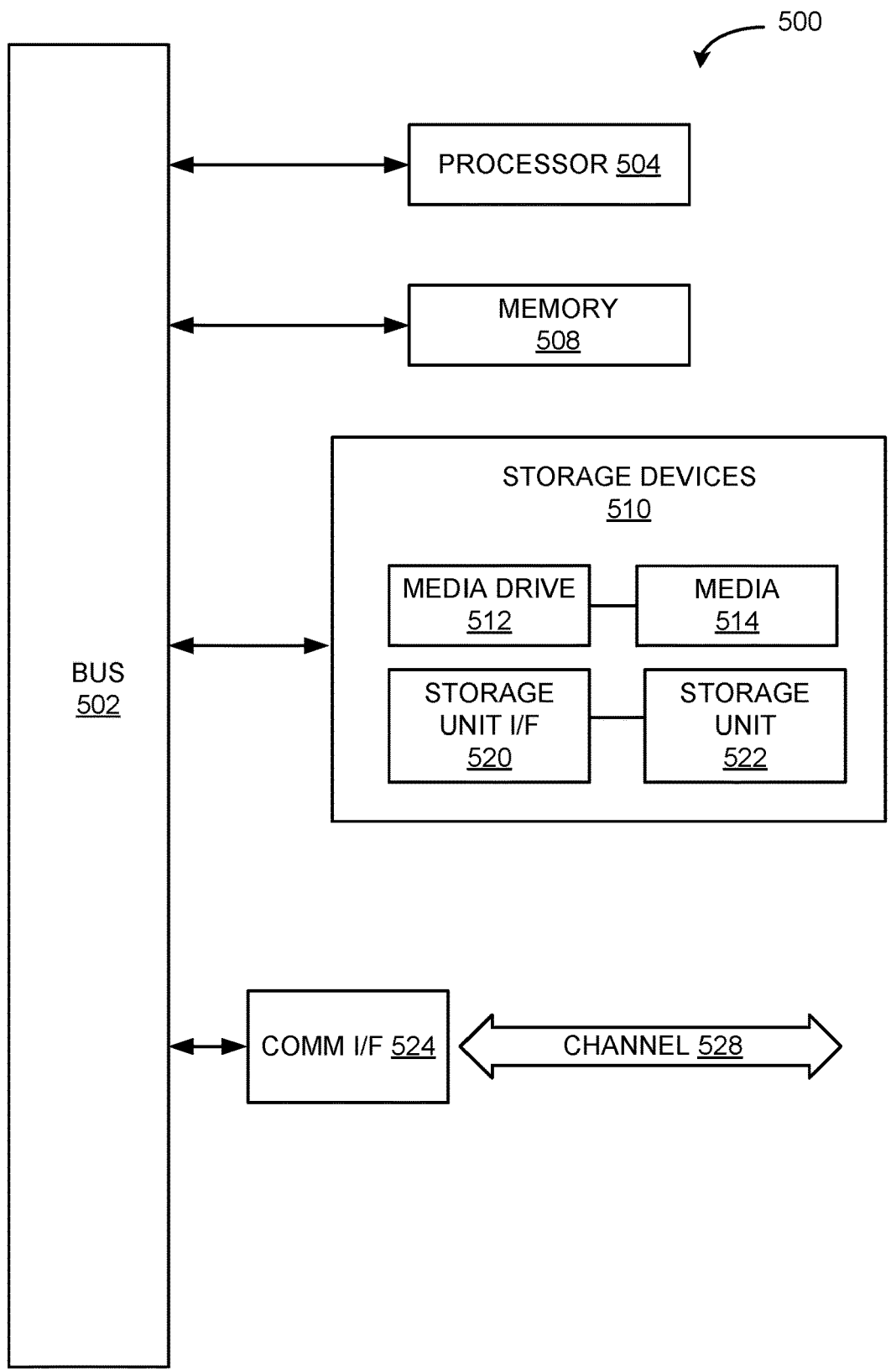
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524.

These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
an internal combustion engine, the internal combustion engine having a throttle;
a two motor hybrid system transmission mechanically coupled to the internal combustion engine;
a shift selector to enable a driver of the vehicle to select a plurality of simulated gears of the two motor hybrid system transmission;
an electric motor mechanically coupled to the internal combustion engine; and
an electronic control unit configured to execute instructions stored in a memory to cause a rotational speed of the internal combustion engine to increase, responsive to the driver of the vehicle using the shift selector to shift from a first one of the simulated gears to a second one of the simulated gears, wherein the second one of the simulated gears is lower than the first one of the simulated gears, wherein to cause the rotational speed of the internal combustion engine to increase, the electronic control unit is further configured to cause the throttle of the internal combustion engine to open, wherein, to cause a rotational speed of the electric motor to increase, the electronic control unit is further configured to transmit a target engine speed to the electric motor.

2. The vehicle of claim 1, wherein the electronic control unit is further configured to cause the rotational speed of the internal combustion engine to increase to a speed that is selected based on a property of at least one of the first one and the second one of the simulated gears.

3. The vehicle of claim 1, wherein, to cause the throttle of the internal combustion engine to open, the electronic control unit is further configured to transmit a target engine speed to the internal combustion engine, the target engine speed being determined by a gear ratio of a desired one of the plurality of simulated gears.

4. The vehicle of claim 3, wherein the target engine speed is adjusted based on at least one of vehicle speed trajectory and expected vehicle speed upon completion of the shift from the first one of the simulated gears to the second one of the simulated gears.

5. The vehicle of claim 4, wherein the target engine speed is further adjusted based on safety considerations pursuant to accelerator pedal actuation.

6. A vehicle comprising:
an internal combustion engine, the internal combustion engine having a throttle;
a two motor hybrid system transmission mechanically coupled to the internal combustion engine;
a shift selector to enable a driver of the vehicle to select a plurality of simulated gears of the two motor hybrid system transmission, and to generate a downshift request responsive to the driver of the vehicle using the shift selector to shift from a first one of the simulated gears to a second one of the simulated gears, wherein the second one of the simulated gears is lower than the first one of the simulated gears;
an electric motor mechanically coupled to the internal combustion engine;
a hardware processor; and
a non-transitory machine-readable storage medium encoded with instructions executable by the hardware processor to perform operations comprising:
receiving the downshift request, and
responsive to the downshift request, causing the throttle of the internal combustion engine to open, which causes a rotational speed of the internal combustion engine to increase, wherein causing a rotational speed of the electric motor to increase in response to a request for increased rotational speed of the electric motor causes the rotational speed of the internal combustion engine to further increase.

7. The vehicle of claim 6, wherein the operations further comprise causing the rotational speed of the internal combustion engine to increase to a speed that is selected based on a property of at least one of the first one and the second one of the simulated gears.

8. The vehicle of claim 6, wherein the speed that is selected varies based on at least one of vehicle speed trajectory and expected vehicle speed upon completion of the downshift.

9. The vehicle of claim 8, wherein the speed that is selected is further varied based on safety considerations pursuant to accelerator pedal actuation.

10. A non-transitory machine-readable storage medium encoded with instructions executable by a hardware processor of a computing component of a vehicle having a two motor hybrid system transmission, the machine-readable storage medium comprising instructions to cause the hardware processor to perform operations comprising:
receiving a downshift request, the downshift request indicating that a driver of the vehicle has used a shift selector of the vehicle to shift from a first simulated gear to a second simulated gear, wherein the second simulated gear is lower than the first gear; and
responsive to the downshift request, causing a rotational speed of an internal combustion engine of the vehicle to increase, comprising causing a throttle of the internal combustion engine to open, wherein causing a rotational speed of an electric motor of the vehicle to increase in response to a request for increased rotational speed of the electric motor causes the rotational speed of the internal combustion engine to further increase.

11. The medium of claim 10, wherein the operations further comprise:
causing the rotational speed of the internal combustion engine to increase to a speed that is selected based on a property of at least one of the first and second simulated gears.

12. The medium of claim 10, wherein the speed that is selected is adjusted based on at least one of speed trajectory of the vehicle and expected speed of the vehicle upon completion of the downshift.

13. The medium of claim 12, wherein the speed that is selected is further adjusted based on safety considerations pursuant to accelerator pedal actuation.

* * * * *